Feb. 21, 1956   J. H. MILLER   2,736,008
COARSE AND FINE MEASURING SYSTEM
Filed Oct. 15, 1951
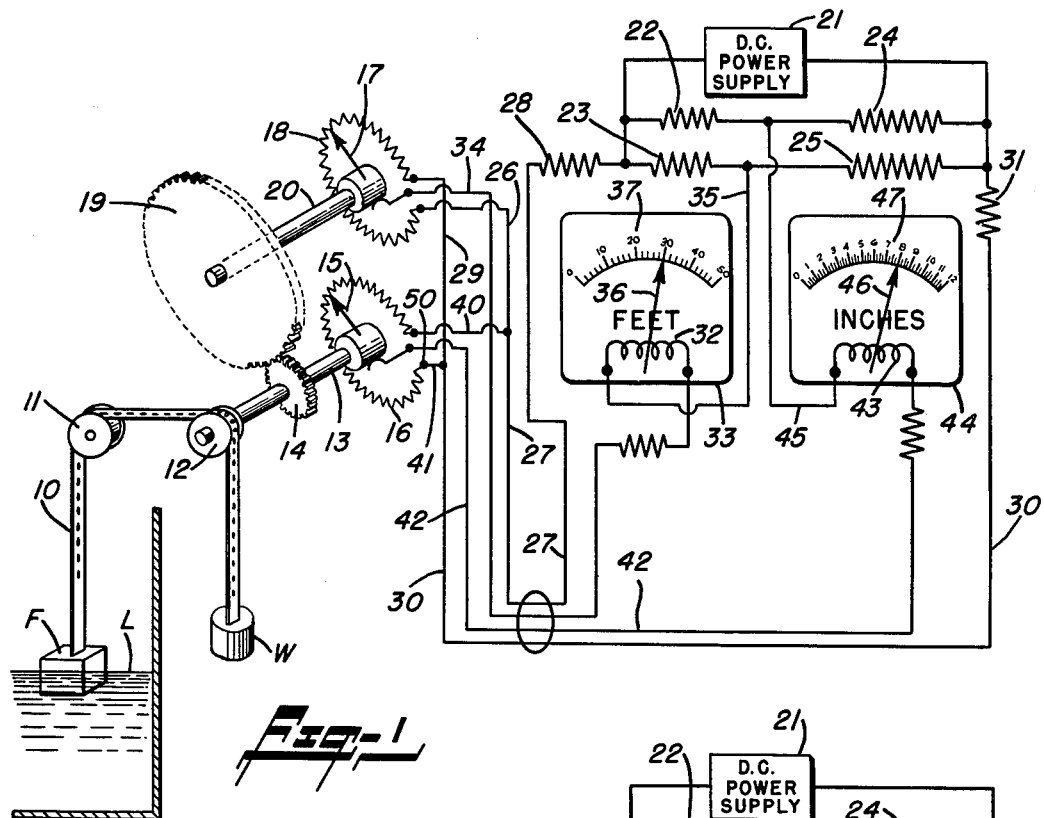
Fig-1
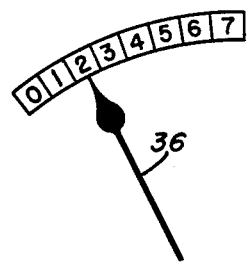
Fig-3
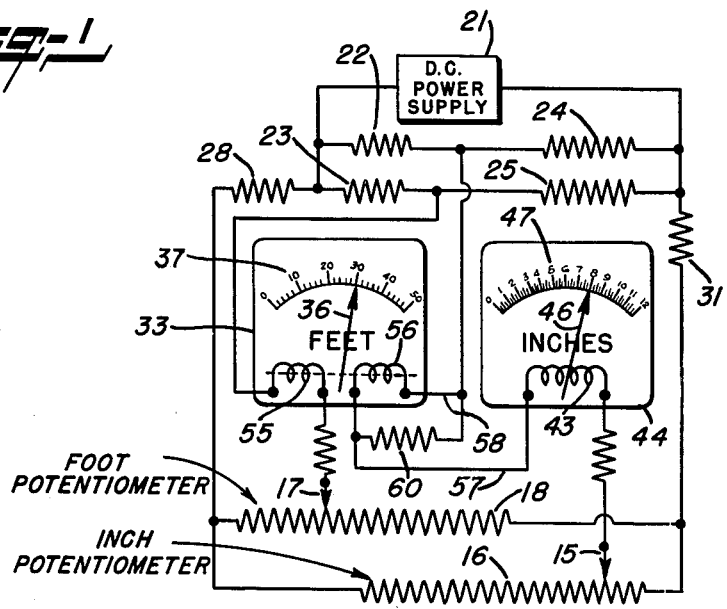
Fig-2
JOHN H. MILLER
INVENTOR.
BY
ATTORNEYS United States Patent Office 2,736,008
Patented Feb. 21, 1956

2,736,008

COARSE AND FINE MEASURING SYSTEM

John H. Miller, Short Hills, N. J., assignor to Weston Electrical Instrument Corporation, Newark, N. J., a corporation of New Jersey Application October 15, 1951, Serial No. 251,359

4 Claims. (Cl. 340—184)

This invention relates to remote reading electrical systems and more particularly to a novel remote indicating system providing separate indications of a variable factor and related multiples thereof.

While the invention is adapted for use in any arrangement requiring a remote indication of a variable condition the following description will be restricted to one specific application, that is, the remote gauging of the liquid level within a tank and wherein the indicating members provide a continuous reading of the liquid level in both feet and inches.

Numerous arrangements exist for indicating the level of a liquid at a remote point by electrical means. One such system, for example, employs a pair of shafts driven by gears having a predetermined tooth ratio, the first shaft being rotatable in response to the vertical movement of a float. Associated with each shaft is a circular potentiometer whereby potentials are obtained which are directly related to the degree of rotation of each shaft and such potentials are employed to energize remotely-positioned indicators having suitably calibrated scales, as in, "feet" and "inches." The difficulty inherent in such system lies in the fact that the "foot" indicator (and the slider of the associated potentiometer) moves only slightly from, say, 3 feet, 11¾ inches to 4 feet, ¼ inch. Such slight normal movement of the "foot" indicator results in an ambiguous reading whereby the indication of the instrument may be taken incorrectly. This condition is aggravated by such factors as play in the gearing system and friction between the various movable parts.

An object of this invention is the provision of an apparatus and a method by means of which a physical displacement of a member in response to temperature or pressure changes, liquid levels and similar variables is converted into electric voltages proportional to such displacements and these voltages, in turn, converted into visible indications of the quantitative values of the variable or employed to control devices for maintaining the variables at desired values.

An object of this invention is the provision of an electrical remote indicating system of positive operation and which is not subject to possible error of indication.

An object of this invention is the provision of an electrical remote indicating system of the potentiometric or variable resistance type and including separate indicating members one of which indicates the condition of a variable factor and the other of which indicates predetermined multiples thereof.

An object of this invention is the provision of an electrical remote indicating system of the potentiometric or variable resistance type comprising a first member continuously responsive to changes in a variable condition, and a second member responsive to predetermined discrete changes in the variable condition.

An object of this invention is the provision of a float-actuated, remote-reading liquid level gauge comprising a first gear rotatable in response to movement of the float, a circular potentiometer having a slider actuated by movement of the first gear, a second gear engaging the first gear, a circular potentiometer having a slider actuated by movement of the second gear, a source of D.-C. potential connected to both potentiometers, an indicating instrument having a scale calibrated in inches and responsive to the potential output of the said first potentiometer, and an instrument calibrated in feet and responsive to the output potential difference between the two potentiometers.

These and other objects and advantages will become apparent from the following detailed description when taken with the accompanying drawings illustrating one embodiment of the invention. It is to be understood the drawings are for purposes of illustration and are not to be construed as defining the scope or limits of the invention, reference being had for the latter purpose to the appended claims.

In the drawings wherein like reference characters denote like parts in the several views:

Figure 1 is a diagrammatic representation and circuit diagram of a remote-indicating liquid level gauge showing, by way of example, a device of the type to which the present invention relates;

Figure 2 is a schematic circuit diagram illustrating my invention as applied to a device of the type shown in Figure 1;

Figure 3 is an enlarged, fragmentary view of a preferred scale carried by one of the remote, electrical indicators.

Reference is now made to Figure 1. A float F is secured to one end of a flexible, perforated tape 10 that passes over a pulley 11 and a sprocket 12, said tape having a balance weight W secured to the other end. The sprocket 12 is secured to a shaft 13 whereby vertical movement of the float, in response to changes in the level of a liquid L, produces a rotation of the shaft. Secured to the shaft 13 is a gear 14 and a slider 15 of the circular potentiometer 16. Similarly, the slider 17 of the circular potentiometer 18 and the gear 19 are secured to the shaft 20, said gear 19 meshing with gear 14 whereby rotation of the shaft 13 results in a predetermined relative rotation of the two otherwise independent sliders. The gearing system is biased by the weight W such that an upward movement of the float, in response to rising of the level of the liquid will result in a clockwise rotation of the shaft 13. On the other hand, the float has sufficient mass to overcome such bias of the gearing system whereby a downward movement of the float, in response to a lowering of the liquid level, will result in a counter-clockwise movement of the shaft 13. In the particular example being described the gear ratio of the gears 14 and 19 is 50 to 1 and the diameter of the sprocket 12 is such as to have a circumference of exactly one foot whereby a one foot movement of the float produces one complete revolution of the shaft 13. Consequently, a change of one foot in the liquid level results in one complete revolution of the slider 15 of the potentiometer 16, and ¹⁄₅₀ of a revolution of the slider 17 of the potentiometer 18. Thus, it will be apparent the voltage output of the two potentiometers 16, 18 will vary directly with the movement of the float and that the change in voltage output can be related to float movement in terms of inches and feet, respectively, by providing suitably-calibrated electrical instruments independently responsive to the voltage output of each potentiometer.

The electrical circuit comprises a D.-C. power supply 21, having an accurately maintained output at a predetermined level of voltage, energizing, effectively, two bridges, one bridge including the fixed resistors 22, 24 and the inch potentiometer 16, and the other bridge including the fixed resistors 23, 25 and the foot potentiometer 18. The foot potentiometer 18 has its ends connected to the power supply by the wires 26, 27 and the line balance resistor 28, and the wires 29, 30 and the line balance resistor 31. The slider 17, of the foot potentiometer 18 is connected to one side of the movable coil 32 of the D.-C. electrical indicating instrument 33, by the wire 34, the other end of the movable coil being connected to a point intermediate of its bridge resistors 23, 25 by the wire 35. It is apparent that the angular rotation of the movable coil 32, and its pointer 36, depends upon the potential output of the potentiometer 18 whereby the instrument scale 37 can be calibrated directly in feet, as shown.

The ends of the inch potentiometer 16 are similarly connected to the power supply 21 by the wires 40, 27 and resistor 28, and the wires 41, 30 and resistor 31, while its slider 15 is connected by the wire 42, to one side of the movable coil 42 of the D.-C. indicating instrument 44. The other side of this movable coil is connected to a point between two of its bridge resistors 22, 24 by the wire 45. Consequently, the rotation of the movable coil 43, and its pointer 46, depends upon the potential output of the inch potentiometer 16 whereby the instrument scale 47 can be calibrated directly in inches as shown.

It may here be pointed out that the two potentiometer sliders 15, 17 are electrically insulated from each other by any suitable, well known means, and that the inch potentiometer is of the full rotation type. By this I mean that the slider 15 remains in contact with the resistance wire throughout an angular rotation of nearly 360 degrees, the open position being restricted to an extremely small angle. More specifically, when the slider 15 is in contact with the terminal 50, the potential across the wires 41, 42 is zero and the pointer 46 of the inch indicator reads zero on the scale 47. As the float 10 rises the slider 15 rotates in a clockwise direction increasing the voltage across the potentiometer output wires 41, 42 and the pointer of the inch instrument moves up scale. Simultaneously with such movement of the inch pointer 46, the slider 17 rotates to increase the voltage output of the foot potentiometer 18 and the pointer 36 of the foot instrument 33 also rotates up scale. However, as has been explained, the foot potentiometer rotates only 1/50 of the distance rotated by the inch potentiometer, and one substantially full rotation of the foot potentiometer corresponds to a voltage change equivalent to the full scale deflection of the foot instrument 33. While the two instruments operate together in a related manner to provide individual foot and inch readings of the liquid level it is quite clear that an error in reading the foot meter can be made. If the actual level of the liquid is 20 feet and ¼ of an inch the pointer of the foot indicator will be alined substantially with the 20 foot scale mark and the pointer of the inch indicator will be alined with the ¼ inch mark. Now, if the liquid level drops to 19 feet, 11¾ inches, the inch indicator will indicate 11¾ inches but the foot indicator will still remain substantially alined with the 20 foot scale marking. Added to this normal reading difficulty are errors resulting from play in the gearing system and friction in the relatively movable parts including instrument friction, all of which reduce the accuracy and dependability of the system as a whole.

To overcome these objections to the Figure 1 device I provide a novel foot indicator employing two windings on the movable coil, one of such windings providing a bucking torque having a scale value of one (1) foot on the foot meter in response to a current change equal to full scale on the inch indicator, together with a block type of scale for the foot indicator. Such novel arrangement is illustrated diagrammatically in Figure 2. The electrical circuit external of the indicating instruments is, essentially, similar to that shown in Figure 1. In Figure 2, however, the foot potentiometer 18 and its slider 17, and the inch potentiometer 16 and its slider 15, are shown in a straight line for purposes of clarity. The foot instrument 33 has a movable coil consisting of two electrically isolated windings 55, 56. The one winding 55 is connected to the slider 17, of the foot potentiometer 18, and the midpoint of the bridge resistors 23, 25, exactly the same as the connection of the movable coil 32 of the Figure 1 device. The other coil winding 56 is connected in series with the movable coil 43 of the inch indicator 44 by the wires 57, 58 and this winding operates in electrical opposition to the winding 55. Thus, the pointer 36 will deflect an angular distance depending on the difference in the torques provided by the windings 55, 56. From a practical standpoint the two potentiometers 16 and 18 can be identical in size and construction and the bucking coil winding 56 can be adjusted by a shunt resistor 60, to a sensitivity only 1/50 as great as the main winding 55. In short, current flowing through the movable coil 43 of the inch indicator flows through the bucking winding 56 of the foot indicator coil but in a direction reverse to that of the main winding 55, and the reverse torque produced by the bucking winding has an effectiveness equal, or comparable to, that of the main winding of the foot indicator. In operation, as the float is raised by the liquid, and as the sliders of the two potentiometers are rotated, the pointers of both indicating instruments will tend to rotate up scale due to the increased voltage applied to the instrument coils. If the bucking winding 56 is not connected, the foot pointer would rotate 1/50 of the full scale deflection for each one foot increase in the level of the liquid, assuming the total scale range of the foot indicator is 50 feet. However, as the inch potentiometer rotates the inch pointer will move upscale and a corresponding current will flow through the shunted bucking winding 56 of the foot indicator. Such progressively-increasing current as flows through the bucking winding 56 just balances the rotational torque generated in the main winding 55 whereby the pointer 36 of the foot indicator remains stationary. As the liquid level rises slightly more than 12 inches the inch potentiometer output drops to zero as the slider moves across the gap between the ends of the resistance winding whereupon the pointer of the inch indicator moves toward the zero scale position. At the same time, and for the same reason, the current flowing through the bucking winding 56 of the foot indicator drops to substantially zero. Since the foot potentiometer remains at its increased voltage position the removal of the bucking torque results in a jump of the foot indicator pointer to the next foot mark on the associated scale. In summary then, as the inch indicator passes its full scale position (representing a 12 inch rise in the liquid level) and drops back to zero, the foot indicator jumps a full foot division upscale. As the liquid level drops a reverse action takes place. The inch indicator pointer moves toward the zero scale position and the bucking torque of the winding 56 of the foot indicator decreases. Such decrease in the bucking torque is balanced by a decrease in the voltage applied to the main winding 55 whereupon the pointer 36 remains stationary. When the voltage output of the inch potentiometer jumps sharply from zero to its maximum value (as the slider passes from one end of the resistance wire to the other) the full torque is generated by the bucking winding of the foot indicator and the pointer 36 jumps to the next lower foot mark on the associated scale.

It will now be clear that the inch indicator responds smoothly and continuously to the change in liquid level whereas the foot indicator jumps sharply a distance corresponding to a full one foot change in the liquid level. Such arrangement eliminates reading errors of the character described with reference to the Figure 1 arrangement.

In order to facilitate the actual reading of the foot indicator I prefer to provide a scale whereon the actual foot markings are associated with arcuate blocks, as shown in Figure 3. Such block arrangement is well adapted for use on the foot indicator as the pointer traverses the scale in a series of discrete jumps rather than in a continuous motion such as the inch indicator. As here shown, the pointer 36 is alined with the third scale block indicating quite clearly the liquid level is 2 feet. To such reading, of course, is added the actual reading of the inch indicator. The pointer 36 will remain in such position as the pointer of the inch indicator moves up or down within its scale range. Once the inch indicator moves beyond its scale range, in either direction, the pointer 36 will jump to the next adjacent block.

As stated hereinabove, the present description has been limited to a float actuated, remote-reading liquid level gauge. However, those skilled in this art will have no difficulty in applying the invention to any specific use wherein it is desired to have one remote member continuously responsive to a variable condition and a second remote member responsive only to predetermined discrete changes in the variable condition. Such applications are, for example, indication of the position of the lock gates in a canal, the position of the ram of a large power press, the position of an elevator or hoisting machinery, etc.

Having now described my invention in accordance with the patent statutes what I desire to protect by Letters Patent is set forth in the following claims.

I claim:

1. An electrical system responsive to changes in a variable condition said system comprising a first potentiometer including a slider, means moving the slider in response to changes in the variable condition, a second potentiometer including a slider, means moving the slider of the second potentiometer in response to changes in the variable condition and at a rate different from that of the slider of the first potentiometer, a source of electrical potential, circuit elements connecting the fixed ends of each potentiometer to the source of potential, a first member including an electrical coil energized by the potential output of the first potentiometer, a second member comprising two coils arranged in electrical opposition one such coil energized by the potential output of the second potentiometer and the other coil connected in a series with the coil of said first member.

2. An electrical system responsive to changes in a variable condition said system comprising a first potentiometer that includes a circular resistance winding having spaced ends that constitute the potentiometer input circuit and a rotatable slider contacting the resistance winding, said slider and one end of the winding constituting the potentiometer output circuit; means rotating the said slider in response to changes in the variable condition, said means rotating the slider across the spaced ends of the resistance winding when the changes in the variable condition reach a predetermined magnitude so that the potential in its output circuit then drops to zero; a second potentiometer including a circular resistance winding having spaced ends that constitute the potentiometer input circuit and a rotatable slider contacting the resistance winding, said slider and one end of the winding constituting the potentiometer output circuit; means rotating the slider of the second potentiometer in response to changes in the variable condition but at an angular rate less than that of the slider of the first potentiometer; a source of electrical potential connected across the input circuit of each potentiometer; a first electrical instrument having a single winding movable coil; a second electrical instrument having a double winding movable coil with the windings arranged in electrical opposition; leads connecting the movable coil of the first instrument in series with one of the windings of the second instrument and to the output circuit of the said first potentiometer; and leads connecting the other winding of the second instrument to the output circuit of the said second potentiometer.

3. An electrical system comprising sensing means motionally responsive to changes in a variable condition, a first potentiometer having a slider so responsive to changes in said condition, a second potentiometer having a slider, means mechanically coupling the slider of the second potentiometer to the slider of the first potentiometer, a source of electrical potential connected across the input circuit of each potentiometer, a first indicating instrument having a movable coil responsive to the voltage output of the first potentiometer, a pointer secured to the movable coil of the first instrument and cooperating with a scale, a second indicating instrument having a movable coil comprising two electrically-opposed windings one of said windings responsive to the voltage output of the second potentiometer and the other winding connected in series with the movable coil of the first indicating instrument, and a pointer secured to the movable coil of the second instrument and cooperating with a scale.

4. An electrical system comprising sensing means motionally responsive to changes in a variable condition and operatively associated with a shaft, a first gear secured to the shaft, a first potentiometer having a slider rotatable in response to rotation of said shaft, a second gear meshing with the first gear and secured to a second shaft, a second potentiometer having a slider rotatable in response to rotation of the second shaft, a source of potential connected across the input ends of each potentiometer, a first indicating instrument having a movable coil energized by the voltage output of the first potentiometer, a pointer secured to the movable coil of the first instrument and cooperating with a scale, a second indicating instrument having a movable coil comprising two separate electrically-opposed windings one of said windings being energized by the voltage output of the second potentiometer and the other winding connected in series with the movable coil of the first indicating instrument, and a pointer secured to the movable coil of the second instrument and cooperating with the scale.

References Cited in the file of this patent

UNITED STATES PATENTS

| | | |
|---|---|---|
| 1,406,500 | Schneider | Feb. 14, 1922 |
| 2,405,493 | Dean | Aug. 6, 1946 |
| 2,448,783 | De Giers et al. | Sept. 7, 1948 |
| 2,631,778 | Piper et al. | Mar. 17, 1953 |

FOREIGN PATENTS

| | | |
|---|---|---|
| 657,031 | Great Britain | Sept. 12, 1951 |
| 905,272 | France | Nov. 29, 1945 |